United States Patent [19]

Høj

[11] 4,174,200
[45] Nov. 13, 1979

[54] APPARATUS FOR THE MANUFACTURE OF A CONTINUOUS FILM OR WEB OF THERMOPLASTIC MATERIAL

[75] Inventor: Peter Høj, Espergärde, Denmark

[73] Assignee: Tetra Pak Developpement SA, Lausanne, Switzerland

[21] Appl. No.: 859,213

[22] Filed: Dec. 9, 1977

[30] Foreign Application Priority Data

Dec. 10, 1976 [CH] Switzerland .................. 15584/76

[51] Int. Cl.² .............................................. B29F 3/04
[52] U.S. Cl. ........................... 425/376 A; 425/376 B; 425/377; 425/378 R; 425/465
[58] Field of Search ............... 425/72 R, 327, 174.8 E, 425/374, 463, 224, 363, 376 A, 378 R, 379 R, 461, 465, 377, 376 B, 404; 264/177 R, 212

[56] References Cited

U.S. PATENT DOCUMENTS

| 3,107,191 | 10/1963 | Brownold | 425/377 X |
|---|---|---|---|
| 3,347,962 | 10/1967 | Dieck et al. | 425/224 X |
| 3,423,493 | 1/1969 | Klenk et al. | 425/377 X |
| 3,439,383 | 4/1969 | Meitinger | 425/224 X |
| 3,694,120 | 9/1972 | Walton | 425/327 X |
| 3,801,249 | 4/1974 | Milani | 425/463 X |
| 3,956,056 | 5/1976 | Boguslawski et al. | 425/224 X |

*Primary Examiner*—Mark Rosenbaum
*Attorney, Agent, or Firm*—Burns, Doane, Swecker & Mathis

[57] ABSTRACT

A web of thermoplastic material and a method and apparatus for manufacture of the web are disclosed with the web having a repeating pattern of alternately thick and thin portions. A molten thermoplastic material is extruded through a duct between a first rotatable driven roll and a circular-cylindrical seat. The first driven roll includes a surface having a pattern of recessed portions. The web is transferred from the first driven roll to a second driven roll having a smooth surface. The temperatures of the first and second rolls may be selectively maintained. The thermoplastic material may be extruded through a plurality of ducts leading to the surface of the first driven roll. Transfer of the web from the first roll to the second may be encouraged by means of a vacuum. Furthermore, complete filling of the recesses of the first driven roll by the thermoplastic material may be encouraged by the use of a vacuum.

10 Claims, 1 Drawing Figure

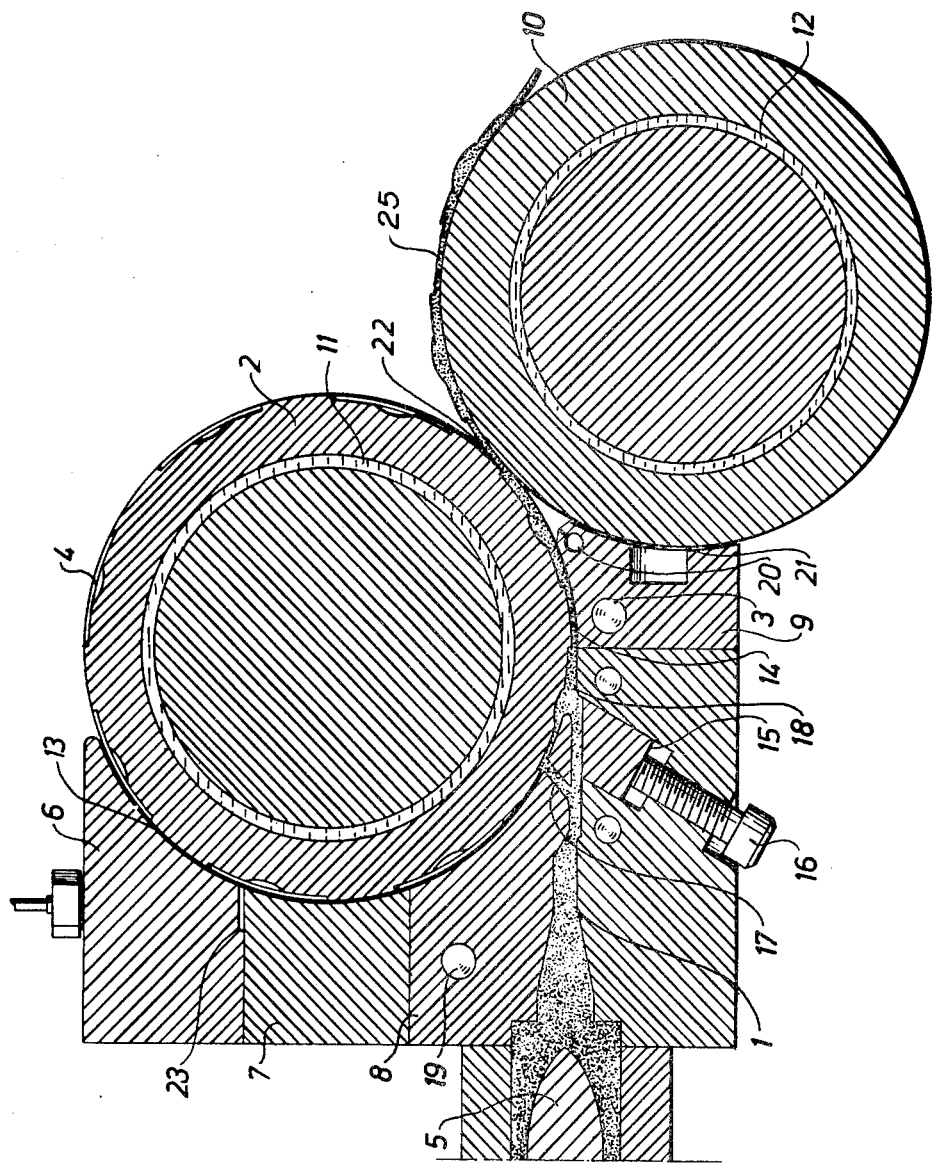

APPARATUS FOR THE MANUFACTURE OF A CONTINUOUS FILM OR WEB OF THERMOPLASTIC MATERIAL

BACKGROUND AND SUMMARY OF THE PRESENT INVENTION

The present invention relates generally to a method and apparatus for the manufacture of a continuous film or web of thermoplastic material which film or web includes portions having a thickness which exceeds the thickness of adjoining portions of the film or web. The invention also relates to a web of thermoplastic material manufactured by means of the method and apparatus of the present invention.

By a method which is well known within the technique of package manufacture, hollow bodies of plastic material can be manufactured by deep-drawing or compression moulding of portions of a plastic material heated to softening. Such a method unfortunately brings with it a certain unavoidable wastage, since not the whole web can be utilized for the deep-drawing. What remains of the plastic material web after certain parts of it have been used for the manufacture of hollow bodies is a network which is formed by the portions which are located between the deep-drawn portions of the packing material web. This network can be used again in many cases for example, by having it ground down and melted again, but it has been found that such a reuse on the one hand can be expensive, whilst on the other hand the properties of the material, e.g. colour, smell, taste are altered after a number of reuses, consequently, the process of repeatedly reusing the material cannot be carried on for too long, and on certain periodically occurring occasions old wastage has to be discarded, and a new start has to be made with a plastic material web of new material from which the wastage once more can be used.

As indicated above, the wastage constitutes a problem in the manufacture of deep-drawn hollow parts from a plastic material web, but in accordance with the present invention it is possible to manufacture a continuous film or web of thermoplastic material in a manner which causes the wastage to be substantially reduced. The basic idea is that the plastic material web along the portions which are used in the deep-drawing of the said hollow bodies has a thickness which is adapted to the size and ultimate wall thickness of the deep-drawn container. Furthermore portions of the plastic material web adjoining them, which are not used of in the deep-drawing, are made appreciably thinner. Since the deep-drawing for the most part takes place with a number of moulding tools working over the width of the plastic material web it is necessary that the web be held together and that portions intended for deep-drawing, which have greater material thickness, are arranged with relatively great accuracy in relation to one another and in such a manner that each portion intended for deep-drawing can be brought into engagement with the respective moulding tool. The portions of the plastic material web located in between, which thus constitute a wastage, have the function of holding together the portions intended for deep-drawing in a predetermined pattern and at a mutual predetermined distance corresponding to the positioning of the moulding tool. Accordingly, the wastage portions in between cannot be made arbitrarily thin but must have enough rigidity to retain the thicker portions intended for deep-drawing in their respective predetermined position.

The invention, as mentioned above, relates to an arrangement for the manufacture of a continuous film or web which is intended to be deep-drawn for the formation of hollow bodies with each body separately or in combination with other bodies forming packing containers. The apparatus of the present invention includes an extruder for supplying molten plastic material. A metal body is connected to the extruder including on the one hand a duct, through which the plastic mass discharged from the extruder is arranged to be conveyed and distributed, and on the other hand two circular-cylindrical seat surfaces, which are arranged to co-operate with two rotatable driven rolls. One of the rolls has recessed portions whose shape, size and mutual position correspond to the said thickened portions of the film or web produced.

BRIEF DESCRIPTION OF THE DRAWING

In the following the invention will be described with reference to the enclosed schematic drawing which shows a cross-section of an arrangement in accordance with the invention.

DETAILED DESCRIPTION OF THE PREFERRED EMBODIMENT

In the arrangement shown in the schematic drawing the nozzle 5 of a plastic extruder is connected to an assembly of several combined metal blocks 6, 7, 8 and 9 which are preferably made of steel. The extruder nozzle 5 is connected to the block 8 which includes a duct 1. The duct 1 at the point of connection to the extruder preferably has a circular cross-section, with the duct during its passage through the block 8 converging in one direction and diverging in the other direction in such a manner, that the duct gradually obtains an oblong cross-section to form at an outlet 18 an elongated, narrow gap. To facilitate the shaping of the duct 1 the block 8 can advantageously be made of two separate parts whose line of separation consists of the duct 1.

The block 8 may be provided with heating cartridges 19 or with cooling ducts to regulate the temperature in different parts of the block. The apparatus further includes a casting roll 2, having a periphery provided with portions 4 that are milled or recessed in some other manner, and which are arranged in a configuration which corresponds to the desired configuration of the thickened portions of the ultimately made plastic material web. The roll 2 moreover comprises a duct 11 through which can be passed a liquid medium for the regulation of the temperature of the roll surface. The roll 2 is arranged to co-operate with a second roll 10 to define a nip between the rolls as illustrated in the single FIGURE having a plain rolling surface, and the roll 10 also includes a duct 12 through which a liquid medium can be made to flow for regulating the temperature of the surface of the roll 10.

The blocks 6, 7, 8 and 9, can be coupled together in the manner indicated above to form together a seat surface 13 for the roll 2. Accordingly, the roll 2 is so fitted into the seat surface 13 that it can rotate with an extremely small gap between the seat surface and the roll surface. A lower part of the seat surface 13 has a widened gap, with the width of the gap corresponding in principle to the desired thickness of the plastic web formed along its thinnest portions, which are located between the portions intended for deep-drawing. The block 9 moreover includes a seat surface 21 against which the roll 10 can be made to rotate with a good fit but without direct contact taking place between the seat surface 21 and the surface of the roll 10. The block 9 includes moreover a duct 20 which is connected to a vacuum source and is connected moreover to a space 22 between the rolls 2 and 10 and the block 9.

The duct 1 in the block 8, through which the molten plastic is to be pressed forward, includes one or more branch ducts 17 which open out at the seat surface 13 of the block 8 in such a manner that the openings of the ducts 17 will coincide with the recessed portions 4 in the roll 2 when the recessed portions turn along the seat surface 13 during the rotation of the roll 2. With the help of the member 15 the flow of plastic material through the duct 1 can be regulated, this regulation being achieved by means of the screw 16.

In operation, the plastic material melted in the extruder 5 is pressed under high pressure into the duct 1. This plastic material can be polyethylene, polystyrene, polypropylene or anyone of the copolymers produced in recent years which have desireable properties, e.g. tightness. Suitable materials which include, but are not limited to acrylo nitrile copolymers, polyethylene terephthalates and butadiene terephthalates. One example of such material with good gas-tightness is the acrylo nitrile material which is marketed under the trade name BAREX.

The plastic mass pressed into the duct 1 completely fills the duct 1 and is pressed out through the slot-shaped opening 18 into the gap 14 between the blocks 8 and 9 and the surface of the casting roll 2. Part of the plastic mass is pressed through the ducts 17 and fills the recessed areas 4 with plastic material at the rate that these areas are passed over the openings of the ducts 17. Accordingly, the recessed portions 4 of the roll 2 are filled with plastic mass when they are brought into contact with the opening 18 of the duct 1 and the plastic mass delivered from the opening 18 is discharged into the gap 14 formed by the blocks 8 and 9 between the casting roll 2 and the seat 3. It would be possible in principle to fill the gap 14 as well as the recessed areas 4 with plastic mass from the duct 1, but it has been found that a better result is obtained if an even outflow of plastic material can be sustained through the gap 18 which corresponds to the thickness of a web which is defined by the gap 14 and an additional amount of plastic material, for the filling out of the recessed portions 4 corresponding to the thickened portions which are to be produced along the areas intended for deep-drawing being supplied through the channels 17. With the help of the member 15 and the associated adjustment screws 16 the cross-sectional area of the duct can be modified, with the result that the amount of plastic material delivered is not actually modified but that instead the pressure in the duct 1 can be adjusted in such a manner that the pressure rises when the duct 1 is constricted. The periodically recurring recessed portions 4, which must be filled with plastic mass, causes the pressure resulting from the required expansion volume of the plastic mass to be momentarily increased. This tendency can be counteracted by positioning the recessed portions 4 so that at all times some portion right across the roll 2 is in engagement with anyone of the ducts 17. In other words, the recessed portions 4 should not be positioned adjoining one another in lines parallel with the axis of rotation of the roll, but should instead be displaced helically along the surface of the roll. It has been found, however, that a complete compensation nevertheless cannot be obtained because the number of recessed portions is relatively low, and it was therefore necessary in certain cases to use an extruder having an adjustable feed screw by means of which drops in pressure can be compensated by imparting to the screw an axial movement in the extruder nozzle so as to keep the pressure of the plastic mass constant during the whole time.

As it is important that the plastic mass should completely fill the recessed portions 4, the temperature and the viscosity of the plastic mass have to be maintained at an appropriate level. This is achieved by means of heating cartridges 19 built into the block which can be switched on and off so as to impart the appropriate viscosity to the plastic mass. Any air pockets occurring in the recessed portions 4 may hinder a complete filling of the recessed portions with plastic mass. It is therefore appropriate to connect the narrow gap 13 to a vacuum duct 23, so as to prevent such air pockets from being formed. The gap 13 is so narrow that no plastic material can be pressed into the same, although the gap is sufficiently wide to allow the passage of air.

The space 22 between the rolls 2 and 10 is also connected to a vacuum source via the duct 20 and the reason for the connection of this space 22 to a vacuum source is that an evacuation of this space facilitates the stripping of the cast plastic web from the casting roll 2. Furthermore an evacuation of the space 22 facilitates an accurate joining of the web onto the plain cooling roll 10, since any air pockets between the plastic material web and the surface of the roll are prevented.

As mentioned earlier, it is possible with the help of the ducts 11 and 12 arranged in the rolls 2 and 10 to control, by means of a liquid medium passing through, the surface temperature of the rolls. It has been found that the casting roll or profile roll should have a surface temperature of approx. 90° C. in the manufacture of a plastic material web consisting of the acrylo nitrile material BAREX, and the surface temperature of the cooling roll should be maintained at approx. 20° C. When the finished web 25 has been stripped off the casting roll or profile roll 2 and has been transferred to the cooling roll 10, the plastic material is stabilized, whereupon it can be wound up onto magazine rolls in a known manner, or it can be fed directly into an arrangement where the thickened portions of the plastic material web are deep-drawn to hollow bodies.

To save energy it may be appropriate to control the temperature of the cooling roll 10 in such a manner that only the thinner portions of the web are completely cooled down and stabilized, with the thicker portions of the web, which form the areas intended for deep-drawing being maintained in a warm condition. The web can then pass directly to the moulding arrangement via a heating station where the thicker portions are further heated to the plasticity required for the moulding operation.

As can be seen from the FIGURE, the thickened portions do not have a uniform thickness, but instead a central part has an additional thickening. It is possible through the design of the recessed portions 4 in a suitable manner to distribute the material thickness within the areas of the web intended for deep-drawing so that as a result an adapted material thickness of the deep-drawn object is obtained.

The hollow bodies or objects deep-drawn from the web 25 are punched in a known manner from the web so as to form self-contained cup-like containers or to be combined with other hollow bodies to bottle or pot type containers, with the network or wastage of thinner plastic material which remains after the punching operations, being reused after grinding.

It has been found that by the use of the arrangement in accordance with the present invention and by the manufacture of a plastic material web having differentiated plastic material thickness great savings could be achieved. In this way it is possible to manufacture a film or a web in accordance with the present invention where the thinner portions only amount to 25–30% of the thicker portions of the web intended for deep-drawing, which of course represents an appreciable saving of plastic material, even if the wastage can to a certain extent be reused.

The present invention has been described with respect to a particular embodiment and may be embodied in other specific forms without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An apparatus for manufacturing a continuous web of thermoplastic material, the web including a pattern of thickened portions each having a thickness which exceeds a thickness of adjoining portions of the web, comprising:
   extruder means for supplying molten thermoplastic material;
   a first cylindrical roll having a surface provided with a pattern of recessed portions each recessed portion having a shape, size and relative position corresponding to the thickened portions of the web;
   a member having a first circular-cylindrical seat surface which is positioned immediately adjacent to, but spaced away from the surface of the first roll;
   duct means for supplying the molten thermoplastic material supplied by the extruder to the space between the member and the surface of the first roll, the duct means extending through the member; and
   a second cylindrical roll having a surface that is smooth and unbroken, the second cylindrical roll being positioned adjacent the first cylindrical roll to receive the web from the first roll and being at a lower temperature than the first cylindrical roll, the first and second cylindrical rolls defining a nip with the formed thermoplastic material of the first cylindrical roll passing in the nip between the first and second cylindrical rolls; and wherein
   the member further includes a second circular-cylindrical seat surface which is positioned immediately adjacent to, but spaced away from the surface of the second roll.

2. The apparatus of claim 1, wherein
   the member is made of metal and further comprising heating means for heating the member in the vicinity of the duct means and the first circular-cylindrical seat surface.

3. The apparatus of claim 1, wherein
   the first and second seat surfaces are provided adjacent to one another, and further comprising:
   vacuum means for providing a vacuum in a space between the member, the second roll and the web.

4. The apparatus of claim 1, wherein
   the member includes a plurality of plates, and wherein
   the duct means includes a duct formed by hollowed portions of two adjacent plates of the member.

5. The apparatus of claim 1, wherein the
   duct means includes a duct having a substantially circular cross-section at one end in close proximity to the extruder means and having an elongated cross-section at another end in close proximity to the first roll with a width that substantially corresponds to a width of the first roll and a thickness that corresponds substantially to a desired thickness of the web.

6. The apparatus of claim 1, wherein a portion of the space between the first roll and the first circular-cylindrical seat surface is so narrow that the molten plastic material cannot penetrate the portion of the space.

7. The apparatus of claim 1, wherein the
   duct means includes a duct having a plurality of lesser duct portions and a main duct portion at an end of the duct in close proximity to the first roll, the plurality of lesser duct portions being upstream of the main duct portion, the plurality of duct portions and the main duct portion providing communication between the extruder means and the first seat surface of the member, the plurality of lesser duct portions having a number which corresponds to a number of recessed portions provided along a width of the first roll, ends of the plurality of lesser duct portions being arranged so that each one of the plurality is successively brought into contact with the recessed portions of the first roll during a rotation of the first roll, whereby the molten plastic material is delivered to the recessed portions directly in a plurality of partial flows through the lesser duct portions.

8. The apparatus of claim 7 further comprising
   throttling means for modifying a cross-sectional area of the main duct portion.

9. The apparatus of claim 8, wherein the main duct portion extends continuously along a direction parallel with axis of rotation of the first roll.

10. The apparatus of claim 1, wherein the first and second rolls further comprise
    means for regulating a temperature of the surface of the first and second rolls by passing a liquid medium individually through the rolls.

* * * * *